United States Patent [19]

Litz

[11] 4,076,988

[45] Feb. 28, 1978

[54] SUPERCONDUCTING DYNAMOELECTRIC MACHINE HAVING A LIQUID METAL SHIELD

[75] Inventor: Donald C. Litz, Franklin Township, Cambria County, Pa.

[73] Assignee: Westinghouse Electric Corporation, Pittsburgh, Pa.

[21] Appl. No.: 715,259

[22] Filed: Aug. 17, 1976

[51] Int. Cl.² ............................................. H02K 9/00
[52] U.S. Cl. ....................................... 310/52; 310/10
[58] Field of Search ..................... 310/10, 40, 52, 178, 310/219, 201, 205, 165, 194, 54; 335/216; 336/DIG. 1

[56] References Cited

U.S. PATENT DOCUMENTS

| 3,242,418 | 3/1966 | Mela | 310/40 |
|---|---|---|---|
| 3,644,766 | 2/1972 | Hughes | 310/40 |
| 3,679,920 | 7/1972 | MacNab | 310/10 |
| 3,942,053 | 3/1976 | Abolins | 310/52 |
| 3,956,648 | 5/1976 | Kirtley | 310/40 |

*Primary Examiner*—R. Skudy
*Attorney, Agent, or Firm*—J. R. Campbell; Z. L. Dermer

[57] ABSTRACT

A superconducting synchronous motor or generator which utilizes separate radiation and damper shields around a superconducting field winding on the machine rotor. The damper shield includes a pair of concentrically disposed cylinders held in radial spaced relationship with each other by pillar type structural members. A liquid metal fills the space between the concentric cylinders and as the rotor, including the cylinders, is accelerated to its operating speed, the liquid metal likewise will reach synchronous speed as a result of viscous drag between the liquid metal and the cylinder walls. During operation, the rotor shielding function is performed by the electrically conducting liquid metal moving at synchronous speed during steady state operation. Current generated in the liquid metal shields the superconducting field winding from alternating flux generated in the armature due to phase imbalance and harmonics. During fault conditions, such as a terminal short circuit, currents are generated in the liquid metal to shield the high armature demagnetizing flux from the superconducting winding. These currents in the liquid metal react with the field flux in the air gap to produce body forces in the liquid metal which result in the motion of fluid particles. Forces moving in a radial direction would tend to establish a pressure gradient in the liquid metal, but since the liquid metal is free to move and the pressure gradient cannot be maintained, flow takes place in the space between cylinders to equalize the pressure in the annulus which contains the liquid metal. Also, since circumferential body forces can transmit shear only by viscous forces, the torque reaction is significantly reduced.

4 Claims, 4 Drawing Figures

SUPERCONDUCTING DYNAMOELECTRIC MACHINE HAVING A LIQUID METAL SHIELD

BACKGROUND OF THE INVENTION

The invention described herein relates to dynamoelectric machines and more particularly to an improved damper shield used with superconducting synchronous motors or generators.

The field windings of superconducting electric machines conventionally are mounted on the machine rotor, and are enclosed in both a concentrically disposed radiation shield and a damper shield. These rotating shield elements are joined to form part of a dewar system which maintains the field winding under a vacuum at 4.2° K (−452° F), to achieve unusually high machine efficiency and performance. The radiation shield which includes both radial and axial members is placed between the warm and cold portions of the machine to reduce the direct thermal radiation from the stator and other supporting structure operating at ambient temperature to the lower temperature components on the rotor. The damper shield concentrically mounted outwardly from the radiation shield and is normally maintained at or near room temperature. It serves the dual function of providing restoring torque to the rotor as a result of load changes, and of shielding the field winding from ac fields generated in the stator from penetrating the low temperature 4.2° K zone, during steady state and transient conditions to minimize undesirable losses. Since the costs for removing these losses by circulating liquid helium through the machine are relatively high, the damper shield is made of a material having high electrical conductivity to provide the protective screening function.

Under circumstances of a terminal short circuit on a superconducting three phase machine, the damper shield can be subjected to radially crushing forces which results from the interaction of armature flux and the shielding flux generated by current induced in the shield. These forces which may act on the shield are illustrated in FIG. 1 and represent those forces resulting from a full three phase short circuit. The forces $P_1$ and $P_2$ for simplicity purposes, are shown as concentrated forces although it will be understood such forces are actually forces distributed around the rotor that vary as $\sin^2\theta$. As shown, force $P_1$ remains fixed with respect to the rotor surface while force $P_2$ moves around the rotor at twice synchronous speed. The combined effect of forces $P_1$, $P_2$ create radially directed crushing forces which may reach values as high as 5000 psi, and cause the damper shield and its support structures to deflect and create high bending stresses in both the support and cylindrical structure. The most important disadvantage resulting from structural deformation is that the deflection could result in contact between the low temperature radiation shield and the field winding which will introduce thermal losses that could result in the loss of superconductivity. Such loss of superconductivity would render the generator useless from both efficiency and performance standpoints. The high stresses in the support structure could also result in plastic deformation that may result in complete structural failure with consequent excessive damage to the machine.

In addition to the radial crushing forces $P_1$, $P_2$ discussed above, a torque T, is also developed in the shield that varies as a damped sine wave following the fault. Depending on the machine stability, such peak torques as may be developed can be as high as 10 times rated machine torque. Since these high oscillating torque values can be reached, a stronger, heavier drive shaft for the machine is required to prevent damage during fault conditions.

SUMMARY OF THE INVENTION

Briefly stated, the above disadvantages are overcome by utilizing a liquid metal damping shield instead of the cylindrical metallic damper shield of the prior art. The shield liquid metal is contained in the annular space defined by a pair of concentrically disposed cylinders which enclose the rotor field winding. The cylinders therefore rotate with the field winding and the liquid metal accordingly reaches synchronous speed. At this speed, the rotor shielding function is performed by the electrically conducting liquid metal in which currents are generated during both steady state and fault conditions. The reaction of these currents with field flux causes the generation of a pressure gradient in the liquid metal which moves the liquid circumferentially in the shield annulus to equalize the pressure therein. These forces likewise generate tangential body forces which result in oscillating liquid flow circumferentially in the damper shield annulus.

It therefore is an object of the invention to provide a damper shield having liquid metal contained therein useful with a superconducting electrical machine.

Another object of the invention is to provide a liquid metal damper shield where the liquid metal therein responds to electrical forces generated in the machine and causes the generation of liquid metal pressure gradients which results in equal distribution of pressure in the damper shield annulus.

Still another object of the invention is to provide a damper shield for a superconducting electrical machine which contains liquid metal in the damper shield which eliminates the reaction torques on the machine drive shaft when the machine is subjected to short circuit fault conditions at its terminals.

BRIEF DESCRIPTION OF THE DRAWINGS

The subject matter of this invention is particularly pointed out and distinctly claimed in the concluding portion of this specification. The invention, however, both as to organization and method of operation, together with further objects and advantages thereof may best be understood by reference to the following description taken in connection with the accompanying drawing in which:

DESCRIPTION OF THE PREFERRED EMBODIMENT

Figure 2:
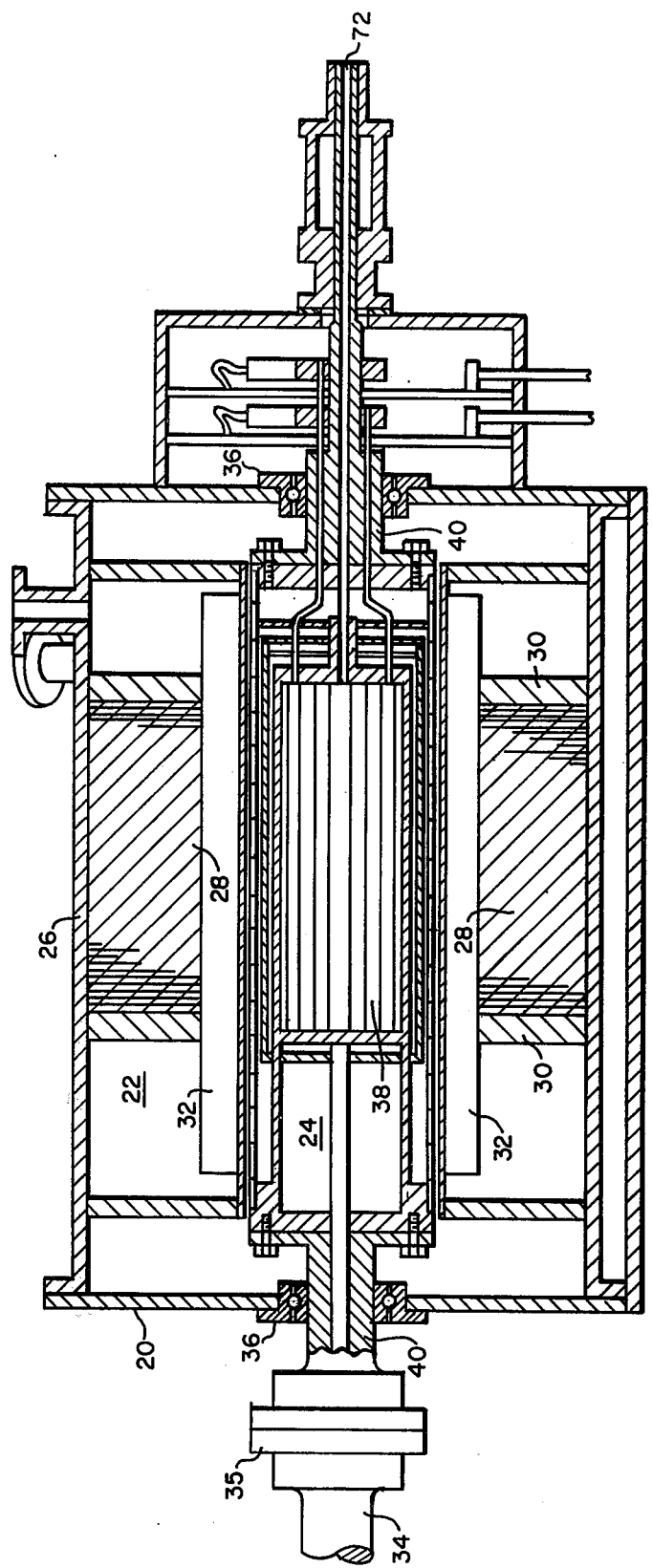
FIG. 2 is a sectional view on elevation, partly in section, illustrating the design of a superconducting synchronous generator.

Referring now to the drawings wherein like reference characters designate like or corresponding parts throughout the several views, there is shown in FIG. 2 a superconducting synchronous generator used to illustrate the teachings of the invention, although it will be apparent as the description proceeds that the invention is equally applicable to other designs and types of dynamoelectric machines. The machine includes a frame 20 arranged to support stator 22 and a rotor 24 axially disposed therein. The stator includes a circumferential ring support 26 which contains a laminated iron core 28 held under compression by end rings 30. An armature winding 32 located in the stator slots in a conventional manner is adapted for connection via terminals (not shown) to a connected load.

The rotor 24 which is centrally disposed within the stator, includes a drive shaft 34 and input coupling 35 which transmits mechanical power to the machine rotor. The drive shaft is mounted in bearings 36 on opposite ends of the frame 20. A field winding 38 mounted on the shaft peripheral surface preferably is not disposed in slots as in conventional designs, but rather is attached directly to the rotor surface.

Figure 3:
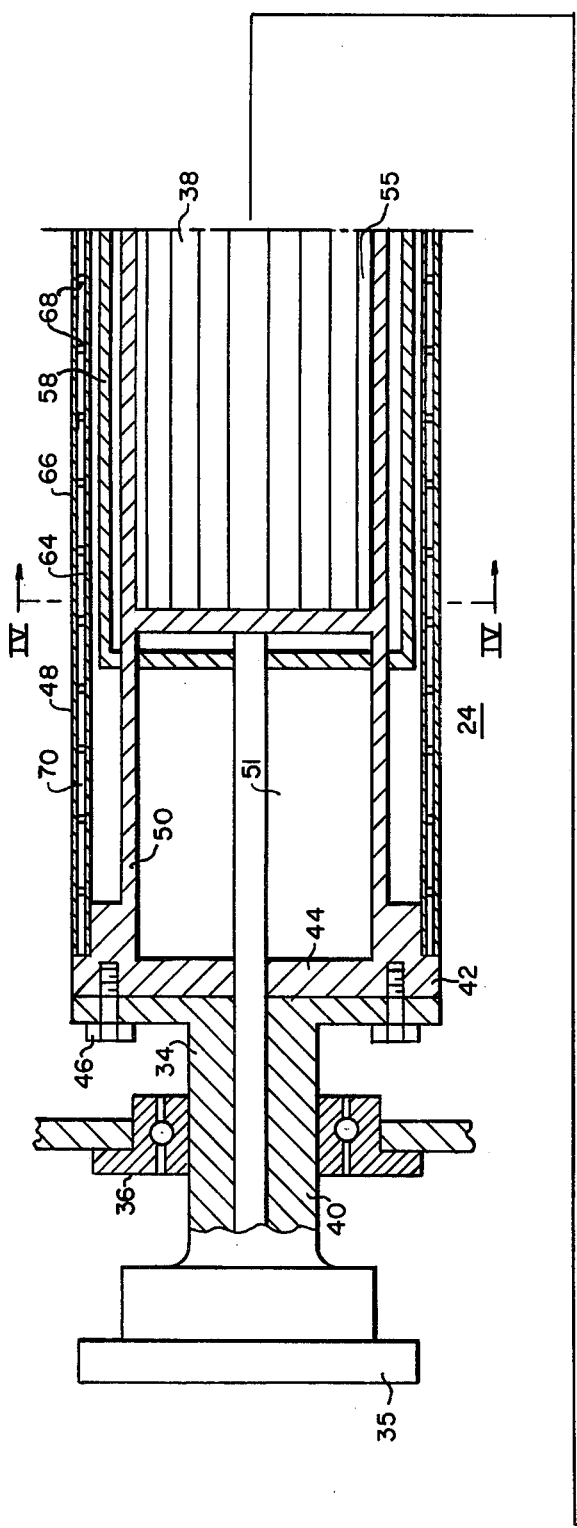
FIG. 3 is a cross-sectional view in elevation, partly in section, showing the design of a rotor used with the generator of FIG. 1.
Figure 3:
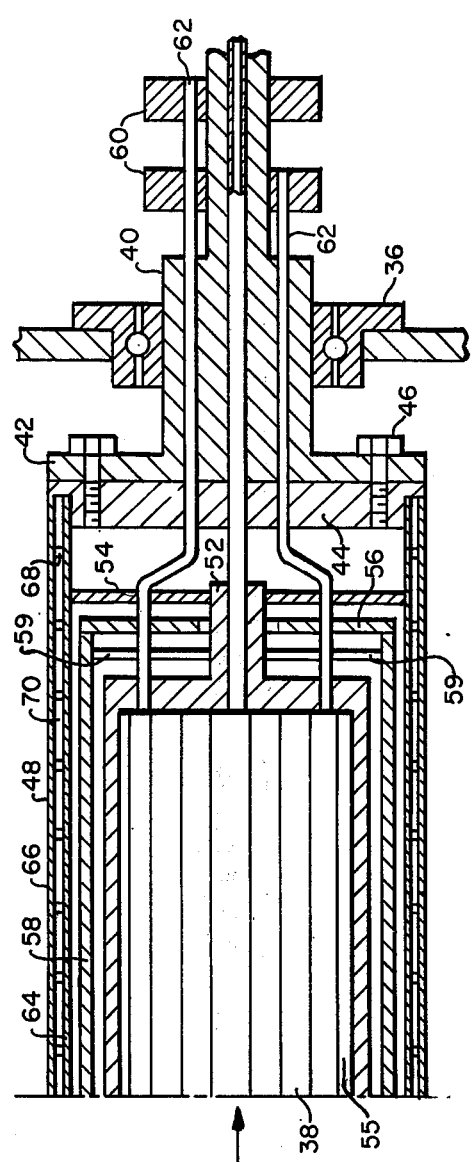

Referring more specifically to the rotor illustrated in FIG. 3, the shaft sections 40 disposed on opposite sides of the rotor rotate in bearings 36 appropriately supported from a base and terminate in flanges 42 integrally formed with the shaft sections. These flanges are bolted or otherwise secured to the ends 44 of the body portion of rotor 24 by bolts 46. Rotor ends 44 are integrally formed with a cylindrically shaped damper shield 48 which constitutes a wall for a dewar and represents the outer peripheral surface which rotates within stator 22. The complete area within the rotor structure is designed to operate under a vacuum of about $10^{-5}$ Torr. A hollow cylindrical torque tube 50 radially spaced from damper shield 48 extends axially inward from wall 44 on the right side of the rotor 24 to provide a void space 51. The tube terminates at its other end in a support member 52 which is held in fixed relationship with the internal section of the rotor by a field support structure plate 54. A second void space 55 inside the torque tube is arranged to accommodate the field winding 38. As described above, axial and radial radiation shields 56, 58 are disposed around the field winding 38 and the shield structure formed is supported by radiation shield support spokes 59 spaced along the rotating element length. Slip rings 60 mounted on the shaft surface in a conventional manner supplies electric power through conductor leads 62 to the rotor field winding to provide the field excitation needed for machine operation.

Figure 1:
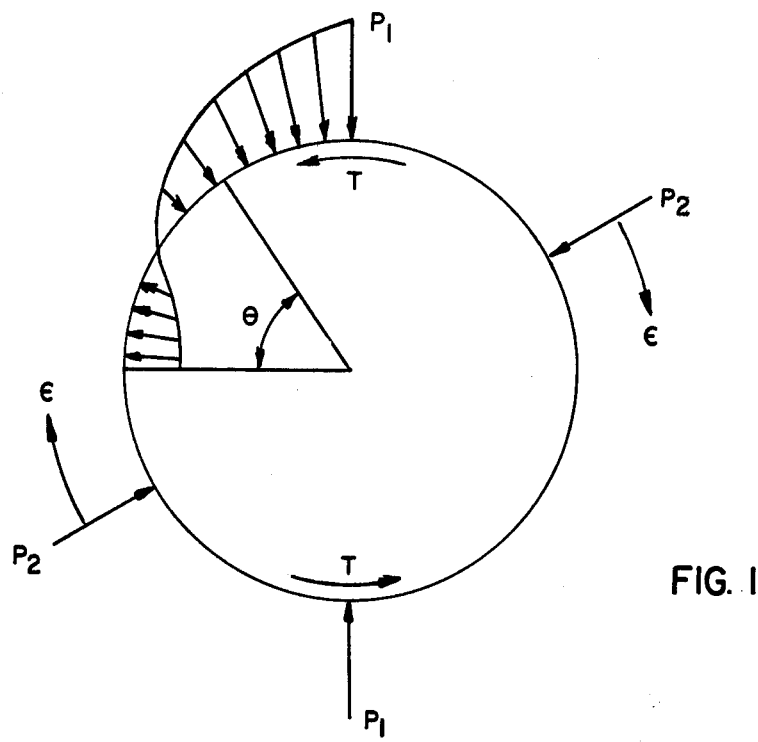
FIG. 1 is a schematic cross-section of a machine damper shield showing force distribution.
Figure 4:
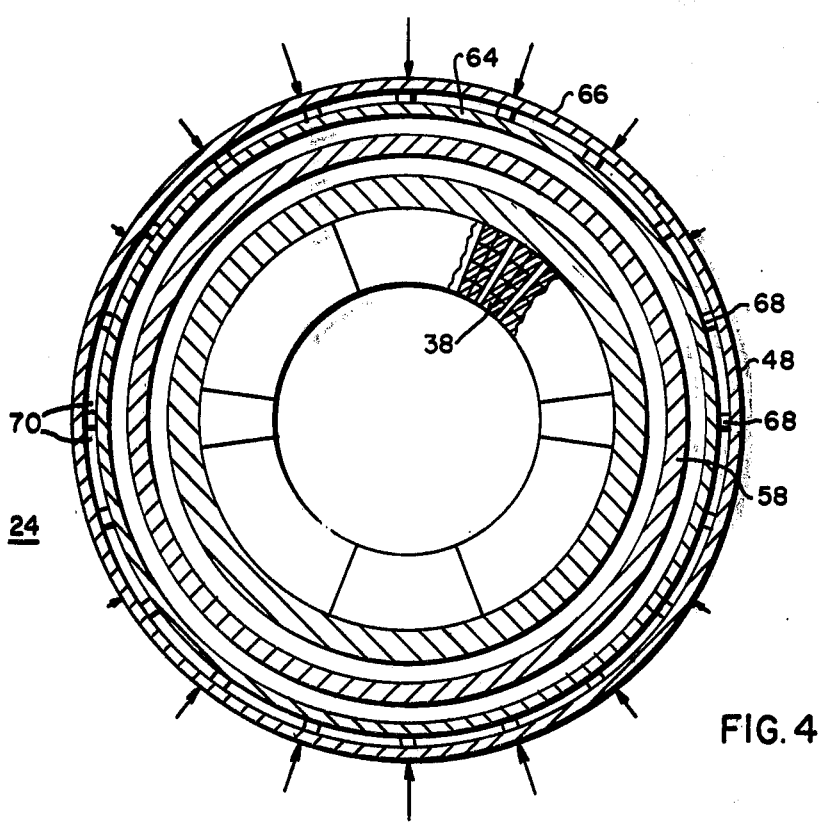
FIG. 4 is a sectional view in elevation taken on line 4—4 of FIG. 3.

As illustrated more clearly in FIG. 4, the damper shield which is located radially outward from the radiation shield 58, includes a pair of inner and outer cylinders 64, 66 concentrically disposed with respect to each other and separated by a number of pillars 68. The space 70 defined by the concentric cylinders contains a liquid metal adapted to circulate therein in response to both centrifugal and electromagnetic forces which act on the liquid metal during machine operation. Since it is important that the liquid metal have complete freedom of circulation, the pillars 68 are of block-like configuration and do not extend a substantial distance either axially or circumferentially of the cylindrical shells 60, 62.

As shown in FIG. 2, the superconducting field winding 38 is cooled by a helium transfer system generally shown on the right side of FIG. 2. Although a number of different arrangements may be used in providing a coolant flow path through the rotor, one such conventional arrangement is to supply helium through an inlet 72 and associated helium transfer equipment including pumps, valves, and the like, not shown, to the superconducting field winding located on the rotor. After the helium absorbs heat generated in the machine, it is returned to the transfer equipment for recycling in the system in a manner well known in the art.

One type of conductor suitable for use in the superconductive field winding is a fine filamentary niobium-titanium conductor twisted in a copper matrix. This type of conductor exhibits low eddy current and hysteresis losses when subjected to rapidly changing and alternating fields of the kind generated in superconducting electrical machines.

These conductors comprising the field winding are mounted on the rotor in a manner which permits helium flow therethrough in an axial direction prior to being returned through a helium discharge outlet for return to the source. Alternatively, the superconductor winding may be immersed in a bath of the liquid helium operating near atmospheric pressure so that as boiling occurs at the winding surfaces, the heat is dissipated by the latent heat of vaporization. Regardless of the particular cooling system used, the winding must be supplied with liquid coolant through a transfer system which consists of stationary and rotating members. Also, the electrical leads interconnected the slip rings and the field winding consists of a multi-filamentary conductor which are insulated from a support tube and are cooled by the helium exhaust gas.

As indicated above, the axial and radial radiation shields 56, 58 serve to reduce the direct thermal radiation from the ambient structures to the cooled components and the low temperature system. These shields are cooled by exhaust helium at some optimum temperature, usually between 20° and 100° K.

The damper shield serves the dual function of providing restoring torque to the rotor when load system changes cause rotor swings, and to shield the superconducting field winding from AC field generated by stator winding harmonics and negative sequence fields, during steady state and transient conditions. Because of the high conductivity of copper and aluminum at low temperatures, very thin shields can be used and the losses will remain small.

As the rotor is accelerated to synchronous or other speed, adherence of the liquid metal to the cylindrical walls forming the damper shield annulus will result in the liquid metal reaching synchronous speed. Since this speed represents steady state operation, currents generated in the liquid metal will shield the superconducting field winding from alternating flux generated in the stator due to the phase imbalance and harmonics. During the more serious fault conditions, such as terminal short circuits, the damper shield normally is subjected to the radial crushing forces due to the interaction of the armature flux and the shielding flux generated by currents induced in the shield. However, the corresponding forces in a liquid metal shield results in the motion of fluid particles. Therefore, as the fluxes interact, currents are generated in the liquid metal which act to shield the armature high demagnetizing flux from the superconducting winding. These currents in the liquid metal react with the field flux in the air gap to produce physical forces in the liquid metal which result in the actual displacement of liquid metal in a circumferential direction in the damper annulus. When the electromagnetic forces are applied in a radial direction, an increase in pressure in the liquid metal normally would result, but since the liquid metal is free to move, the pressure gradient cannot be maintained and flows will be induced to equalize the pressure in the annulus containing the liquid metal. The tangential body forces that applied an oscillating torque on the metallic damper of the kind used in the prior art, will cause the liquid metal to flow in an oscillating manner and circumferentially in the damper shield liquid metal annulus.

The pillars provided between the inner and outer cylindrical shells, provides sufficient support structure to maintain the integrity of the annulus. As pressures are generated or developed in the annulus, they will tend to compress the inner cylinder and expand the outer containment cylinder. This radial support structure offsets the pressure rise in the annulus by developing tensile stresses as the inner and outer structures tend to separate.

Since the liquid metal can only transmit force by pressure and shear and since large pressure gradients cannot be maintained in the annulus, the forces on the containment cylinders will constitute external and internal pressures thus eliminating the bending stresses encountered in the metallic shield of the prior art. Also, since the circumferential body forces can transmit the shear only by viscous forces, the torque reaction will be significantly reduced.

A variety of liquid metals may be used in the annulus such as mercury, gallium, indium, woods metal, sodium, potassium, or alloys of these metals. If the conductivity is not sufficiently high, metallic particles may be added since this technique has been successfully used in ferro fluids where magnetic particles are ground to small diameters in the order of angstroms and essentially dissolved in a fluid.

It will be apparent that many modifications and variations are possible in light of the above teachings. It therefore is to be understood that within the scope of the appending claims, the invention may be practiced other than is specifically described.

I claim:

1. A superconducting dynamoelectric machine comprising a frame enclosing a stator having an armature winding therein, and a rotor supporting a superconducting dc field winding arranged for rotation in said stator,
    means for supporting said rotor for rotation on bearings in said frame,
    said rotor including a cylindrical member completely enclosing said field winding,
    means on said cylindrical member supporting the field winding, said means being of sufficient structural strength to absorb torque forces imposed on said rotor during operation,
    radiation shield means in said cylindrical member for absorbing thermal radiation from structural members operating in substantially ambient temperature,
    said cylindrical member including damper shield means which contains an electrically conductive liquid which is effective in restoring torque to the rotor when load system changes and in shielding the superconductive field winding from ac fields generated in the stator during operation, and
    means in said shaft for supplying excitation current to said winding and cooling means associated with said machine for furnishing a fluid coolant to said rotor for maintaining the field winding at about 4.2° K.

2. The machine according to claim 1 wherein the damper shield means comprises a pair of cylindrical members held in spaced relation to each other by spacer supports which determine the distance between said members, and wherein said electrically conductive liquid fills the space between said cylindrical members.

3. The machine according to claim 2 wherein said electrically conductive liquid comprises a liquid metal which during fault conditions on the machine generates a current in the liquid metal which reacts with field flux in the air gap to produce forces on the liquid metal which causes it to flow and equalize the liquid metal pressure between the cylindrical members.

4. The machine according to claim 1 wherein said damper shield means comprises a pair of concentric cylinders held in spaced relation with each other, said spaced cylinders forming a closed annulus,
    a liquid metal in said annulus, said liquid metal being effective in performing a dampening function by generating currents therein which preclude the transmission of high flux forces from the stator to said superconducting winding, said forces resulting in the establishment of pressure fluctuations and circulating flaws in the liquid metal.

* * * * *